Aug. 10, 1954     M. P. G. CAPELLI     2,686,302
RADIO ALTIMETER
Filed Dec. 29, 1950     2 Sheets-Sheet 1
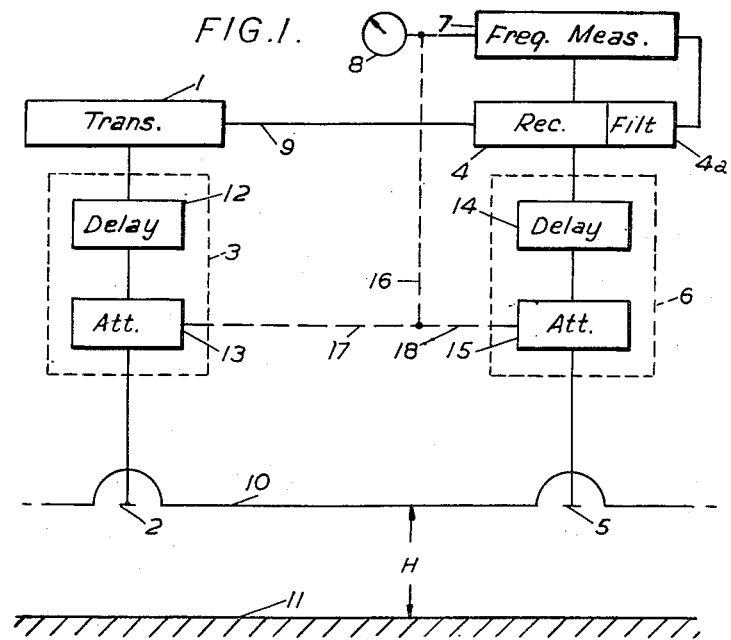
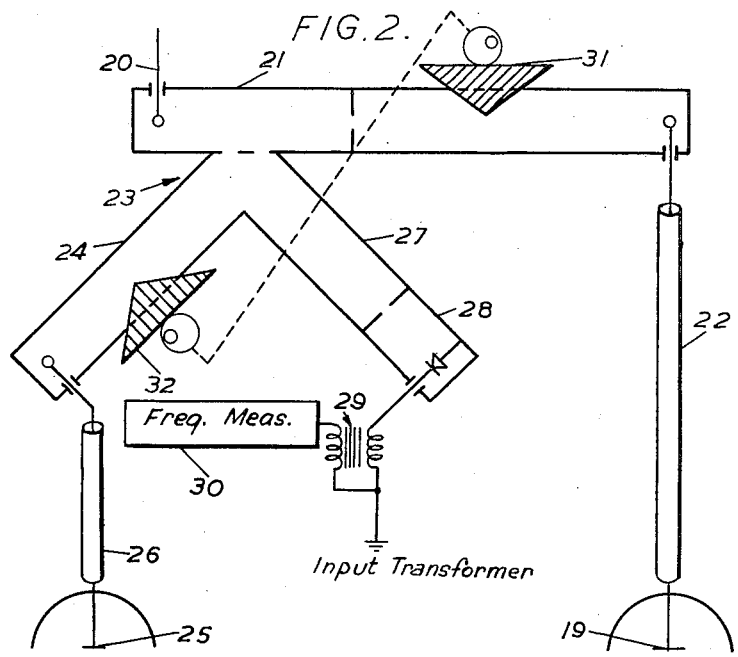
Inventor
MARINO P. G. CAPELLI
By R. C. Morris
Attorney Patented Aug. 10, 1954

2,686,302

UNITED STATES PATENT OFFICE 2,686,302

RADIO ALTIMETER

Marino Pompeo Giovanni Capelli, London, England, assignor to International Standard Electric Corporation, New York, N. Y., a corporation of Delaware Application December 29, 1950, Serial No. 203,250

Claims priority, application Great Britain December 30, 1949

7 Claims. (Cl. 343—14)

This invention relates to radio altimeters such as are used in aircraft and are of the type in which an altitude indication is determined by the beat frequency between a frequency modulated transmitted wave and its contemporaneously received echo wave reflected from the ground.

Such an altimeter comprising a frequency-modulated transmitter coupled by suitable means to a transmitting antenna, a receiver coupled by suitable means to a receiving antenna, these two antennae being both directive towards the ground but so arranged as to have as little as possible mutual coupling, and means for injecting part of the transmitter output into the receiver, the receiver including means for beating the wave injected therein by the transmitter against the wave picked up by the receiver antenna, detector means for obtaining a wave having the difference-frequency resulting from the beating process, and means for frequency counting i. e. measuring the frequency of this difference frequency wave, and an altitude-indicating meter or other device responsive to the result of the frequency counting.

Under normal flying conditions the receiver is fed only by the injected wave and by a wave picked up by the receiving antenna after a single reflection from the earth, the reflected wave being of amplitude smaller than the injected one, and the beating process yields a single beat frequency giving a straight-forward indication of the altitude. When flying at very low altitudes, however, and particularly when landing, experience has shown that the operation of the altimeter may become unreliable owing to the reception of echo signals over abnormal paths giving rise to spurious indications.

The principal object of the present invention is therefore to provide a radio altimeter giving satisfactory operation even at very low altitudes.

According to the most general aspect of the present invention there is provided a radio altimeter of the frequency sweep type in which a frequency modulated transmitter and a receiver are coupled to respective antennae over respective coupling means, and in which at least one of said coupling means includes means for reducing the effect of spurious echo signals on the indication given by the altimeter.

More particularly, there is provided a radio altimeter comprising a frequency modulated transmitter, a transmitting antenna, first coupling means interconnecting said transmitter and said transmitting antenna, a receiver, a receiving antenna, second coupling means interconnecting said receiver and said receiving antenna, signal-injecting means adapted to inject signals from said transmitter into said receiver over a route which includes said antennae, frequency measuring means responsive to the frequency of the beats in said receiver between said injected signals and echo signals received via said receiving antenna, and height indicating means responsive to the output of said frequency measuring means, at least one of said coupling means comprising means for reducing the effect of spurious echo signals. The said means for minimising the effect of spurious echo signals may comprise delay means such that the propagation time over both said circuit means together is equal to the go and return free space propagation time for a predetermined altitude. Further means may include means arranged to insert attenuation in the coupling means when the altitude is at or below a predetermined level. In addition, the circuits may be so arranged that spurious signals received via the transmitting antenna are not allowed to affect the receiver.

The nature of the invention will be better understood from the following description, taken in conjunction with the accompanying drawings, in which:

Fig. 1 is a general representation in block form of an embodiment of the invention;

Fig. 2 represents diagrammatically certain essential details of a particular embodiment of the invention.

Figure 3:
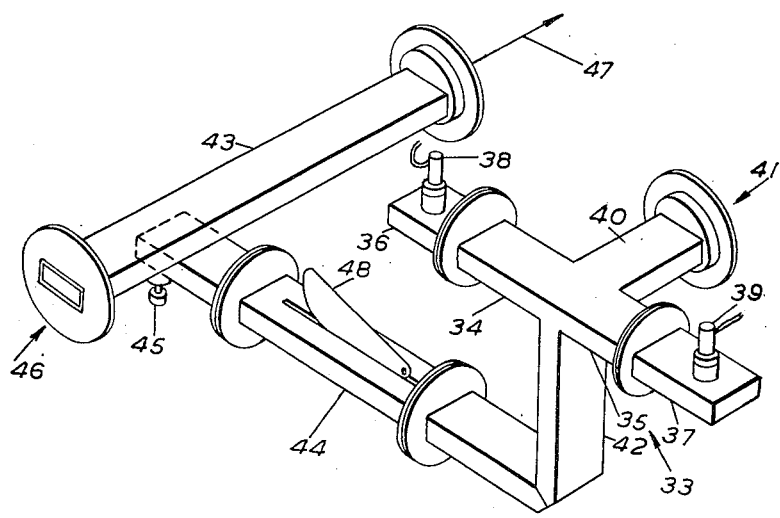
Fig. 3 represents diagrammatically certain essential details of a modification of the embodiment illustrated in Fig. 2.

Turning now to Fig. 1, this shows a frequency-sweep altimeter comprising a frequency modulated transmitter 1 coupled to a transmitting antenna 2 by coupling means 3, and a detecting receiver 4 coupled to a receiving antenna 5 by coupling means 6, the output of the receiver 4 being fed to a frequency measuring device 7 which operates a height indicator 8. Part of the output from transmitter 1 is injected into receiver 4 over connection 9. The antennae 2 and 5 are located opposite respective reflecting wells in the conducting surface 10 of an aircraft structure, the height of this surface above ground level 11 being indicated by symbol H. The coupling means 3 comprises delay means 12, such as a length of delay cable, and attenuation means 13, such as a resistance network, whereby signals passing in either direction between transmitter 1 and antenna 2 are both delayed and attenuated. While for the sake of simplicity the delay and attenuation functions are shown as occurring in separate apparatus units, it is to be understood that such separation of the functions is not essential, and that in certain constructions it may be found convenient to incorporate both functions in a single apparatus, for example a length of cable or wave guide the characteristics of which are such that the cable supplies both the desired delay and the desired attenuation. Similarly, coupling means 6 comprises delay means 14 and attenuation means 15 whereby signals passing in either direction between receiver 4 and antenna 5 are both delayed and attenuated.

In such an altimeter the main component of the output from detecting-receiver 4 is normally a wave of frequency equal to the beat frequency between the signal input injected over connection 9 and the signal picked up by antenna 5. Neglecting for the moment the effect of delay means 3 and 6 this beat frequency is, as is well known, directly proportional to the time taken to propagate a signal from the transmitter 1 to receiver 4 by radiation from antenna 2 to ground followed by reflection from the ground to antenna 5, i. e. over a path of length substantially equal to 2H and of propagation time 2H/C, when C is the velocity of light.

In certain circumstances, however, spurious beat frequencies are set up in the receiver owing to spurious signals being received over abnormal paths as well as over the normal path. This is particularly liable to occur at low heights above ground, when both the normal and the abnormal signals have amplitudes which are large relative to the injected signal. One such spurious signal is that received by double reflection from the ground, over a propagation path from the transmitter 1 to receiver 4 via transmitting antenna 2, reflection at ground level 11, reflection from the plane surface 10, a second reflection from ground level 11, and finally via receiving antenna 5, the total path length being approximately equal to 4H. There appears therefore at the output of the receiver-detector 4 a spurious beat frequency corresponding to beats between the signal received over the normal path and that received over the double reflection path just mentioned, i. e. a beat frequency corresponding to the path difference given approximately $4H-2H=2H$, which beat frequency is sufficiently close to the true beat frequency to cause an error in the height indication. In order to reduce this type of error, the coupling circuits 3 and 6 are so designed as to include delay means as shown at 12 and 14 such that the total time delay for both the coupling circuits together corresponds to the go and return space propagation time for a predetermined low altitude, for example 1 meter, which for convenience may be designated as $H_1$. With this delay in use, the beat frequency between the injected signal and the true path reflected signal corresponds to the path difference $(2H_1+2H)$, while the beat frequency between the time path reflected signal and the double reflection signal corresponds to the path difference.

$$(2H_1+4H-2H_1-2H)=2H$$

The wanted beat frequency is therefore now always greater than the spurious double reflection signal, which latter may be cut out entirely by means of a high pass filter 4a in the output circuit of the receiver 4. In addition, the height indicator 6 will have its zero off-set by an amount $H_1$, this off-setting is independent of height, and the instrument may therefore be recalibrated for any particular value of the total delay i. e. any particular value of $H_1$. Preferably the total time delay is distributed equally between the two coupling circuits 3 and 6.

Other spurious signals may arise from transmissions over paths which, while involving not more than one ground reflection, are nevertheless not the normal operating paths. For example, a signal may travel from the transmitter through the coupling means to the transmitting antenna, be received on that same antenna after reflection from the ground, and reach the receiver via the transmitter antenna coupling means followed by the circuit through which the transmitter output is normally injected into the receiver. Further, a signal may be transmitted through the injection circuit to the receiver and hence over the receiver antenna coupling means to be radiated by the receiver antenna, the reflected signal returning to the receiver and detector means in the normal manner. The effect of spurious signals of these types generally becomes more evident when the effect of the double reflection signal has been removed by time delay in the antenna coupling means 3 and 4 of Fig. 1 as indicated hereinbefore. The path lengths involved are of the same order as that of the "true signal," provided that the two antenna coupling units have equal time delays, and the resultant beat waves are consequently of the same order of frequency as that required for a correct altitude indication. Usually the strengths of these spurious signals when operating at very low altitudes, are at least comparable with the level injected from the transmitter into the receiver, and may seriously influence the mode of operation of the detector means. In order to reduce this influence it is necessary to reduce the amplitude of all inputs to the receiver other than that injected directly from the transmitter. This is accomplished by the attenuation means 13 and 15 which form parts of the antenna coupling circuits 3 and 6 respectively, and are brought into service at low altitudes. Preferably the attention means 13 and 15 are controlled from the altitude indicator to operate automatically when the altitude falls below some predetermined level, say 30 metres, the control mechanism, indicated on Fig. 1 by the dashed lines 16, 17, 18 being preferably so arranged that the attenuation is introduced gradually in order to prevent violent and sudden fluctuations in signal strength. The total attenuation is preferably equally distributed between the two coupling circuits. A suitable value for the total attenuation has been found to be about 10 decibels. The residual effect of the spurious signals takes the form of an amplitude interference of low frequency which is easily filtered out. The equipment must of course have sufficient signal strength to operate reliably at the predetermined altitude with full attenuation in circuit.

It is to be understood that both the time-delay means and the attenuation means hereinbefore mentioned should be designed for proper impedance matching with the circuits into which they are connected. If these components are not properly matched to the circuits the impedance discontinuities will result in reflections giving rise to still more spurious signals.

In addition to reducing the effect of spurious signals by time-delay and attenuation means as already described, the coupling circuits between the various apparatus units of the altimeter may be adapted to prevent spurious signals picked up by the transmitter antenna from reaching the detector and to prevent energy being radiated from the receiving antenna. Such an arrangement is included in a particular embodiment of the invention which makes use of wave guide technique as diagrammatically illustrated in Fig. 2. In this embodiment the output of the transmitter is fed to the transmitting antenna 19 over line 20 and then through a length of wave guide 21 followed by a length of delay cable 22, the output of the cable feeding the transmitting antenna. Coupled to the wave guide is a two branch "directional coupler" 23, the first branch 24 of which is coupled to the receiving antenna 25 through a length of delay cable 26 while the second branch 27 terminates in a crystal mixer chamber 28, the crystal output being fed through a transformer 29 to the frequency measuring system 30. The effect of this arrangement is that the mixer chamber 28 receives energy from the receiving antenna 25 via the delay cable 26 and the first branch 24 of the coupler, and also receives energy injected from the transmitter via the wave guide section 21 and the second branch 27 of the coupler, but does not receive any energy picked up from space by the transmitting antenna 19. In addition, no energy from the transmitter can reach the receiving antenna through the directional coupler 23, and so this source of spurious signals is eliminated. The attenuation previously referred to is obtained by means of two mechanically coupled attenuators 31 and 32 of the resistive films type, located respectively for insertion, one in the wave guide 21 at a point between the union with the coupler 23 and the junction with the transmitting antenna delay cable 32, and the other in that branch 24 of the coupler which is joined to the receiving antenna delay cable 26.

Fig. 3 illustrates the wave guide portion of an arrangement which is generally similar to that of Fig. 2 but differs therefrom in that the directional coupler 23 with its crystal mixer chamber 28 is replaced by a hybrid coupler and balanced crystal mixer. Referring to Fig. 3, there is shown at 33 a wave guide hybrid coupler of the type usually referred to as a "Magic Tee" junction. The opposing branches 34, 35 of junction 33 terminates in respective crystal mixer chamber 36, 37, the outputs of which are connected via terminals 38, 39 to the balanced input circuit of the frequency measuring device (not shown). Another branch 40 is adapted for coupling at 41 to a wave guide and delay cable system (not shown) over which signals picked up by the receiving antenna are fed to the junction, this wave guide being provided with attenuation means corresponding to attenuator 32 in Fig. 2. The remaining branch 42 is connected to the transmitting antenna wave guide 43 by means of guide 44 and adjustable probe 45 which traverses both guide 43 and guide 44. One end 46 of guide 43 is adapted for coupling to the transmitter (not shown), the other end 47 being adapted for connection to the transmitting antenna through a wave guide attenuator and cable delay system (not shown) corresponding to 21, 31, and 22 of Fig. 2. Preferably, but not necessarily, wave guide 44 is equipped with an attenuating resistance film 48 which is preset to a suitable value, in order to adjust the input from the transmitter wave guide 43 to the hybrid coupler 33. This arrangement has the advantage that it prevents radiation from the altimeter transmitter via the receiving antenna, thereby avoiding one type of spurious signal, while at the same time spurious signals received by the transmitting antenna and applied through guide 44 to the crystal detectors merely modulate the injected signal and result in detector products which are balanced out automatically due to the balanced detector system.

While the principles of the invention have been described above in connection with specific embodiments, and particular modifications thereof, it is to be clearly understood that this description is made only by way of example and not as a limitation on the scope of the invention.

What we claim is:

1. A radio altimeter comprising a frequency modulated transmitter, a transmitting antenna, first coupling means interconnecting said transmitter and said transmitting antenna, a receiver, a receiving antenna, second coupling means interconnecting said receiver and said receiving antenna, signal-injecting means adapted to inject signals from said transmitter into said receiver over a route which excludes said antennae, frequency measuring means responsive to the frequency of the beats in said receiver between said injected signals and echo signals received via said receiving antenna, and height indicating means responsive to the output of said frequency measuring means, one of said coupling means comprising delay means for reducing the effect of spurious echo signals.

2. A radio altimeter according to claim 1, wherein said delay means is selected such that the propagation time over both said coupling means together is equal to the go and return free space propagation time for a predetermined altitude.

3. A radio altimeter according to claim 2, and further comprising a high pass filter in the output circuit of said receiver to exclude frequencies up to that corresponding to said predetermined altitude.

4. A radio altimeter according to claim 1, wherein each said coupling means comprises a delay means and includes a given length of delay cable respectively.

5. A radio altimeter according to claim 1 wherein said coupling means further comprises attenuation means for reducing the effect of spurious echo signals.

6. A radio altimeter according to claim 5, wherein said attenuation means comprises a pair of ganged attenuators, and means for coupling said attenuators into respective ones of said coupling means only when the altitude to be measured falls below a predetermined value.

7. A radio altimeter according to claim 1 wherein said first and second coupling means comprise respective wave guides of a wave-guide directional coupler, said coupler constituting said signal-injecting means and prevents spurious echo signals received on said transmitting antenna from being applied to said receiver.

References Cited in the file of this patent

UNITED STATES PATENTS

| Number | Name | Date |
| --- | --- | --- |
| 2,222,587 | Sanders | Nov. 19, 1940 |
| 2,247,662 | Newhouse | July 1, 1941 |
| 2,261,272 | Newhouse | Nov. 4, 1941 |
| 2,422,133 | Sanders | June 10, 1947 |
| 2,423,644 | Evans | July 8, 1947 |
| 2,510,710 | Moore | June 6, 1950 |
| 2,557,864 | Doremus | June 19, 1951 |
| 2,568,090 | Riblet | Sept. 18, 1951 |